(12) United States Patent
Korsgren et al.

(10) Patent No.: US 11,549,419 B2
(45) Date of Patent: Jan. 10, 2023

(54) METHOD FOR REDUCING DEPOSITS RELATED TO A REDUCTION AGENT IN A PORTION OF AN EXHAUST AFTERTREATMENT SYSTEM

(71) Applicant: VOLVO TRUCK CORPORATION, Gothenburg (SE)

(72) Inventors: John Korsgren, Hisings Kärra (SE); Martin Wilhelmsson, Gothenburg (SE)

(73) Assignee: VOLVO TRUCK CORPORATION, Gothenburg (SE)

(*) Notice: Subject to any disclaimer, the term of this patent is extended or adjusted under 35 U.S.C. 154(b) by 0 days.

(21) Appl. No.: 17/731,639

(22) Filed: Apr. 28, 2022

(65) Prior Publication Data

US 2022/0349327 A1 Nov. 3, 2022

(30) Foreign Application Priority Data

Apr. 30, 2021 (EP) ..................................... 21171411

(51) Int. Cl.
*F01N 3/20* (2006.01)
*G01C 21/36* (2006.01)
*F01N 9/00* (2006.01)

(52) U.S. Cl.
CPC .............. *F01N 3/208* (2013.01); *G01C 21/36* (2013.01); *F01N 9/005* (2013.01);
(Continued)

(58) Field of Classification Search
CPC combination set(s) only.
See application file for complete search history.

(56) References Cited

U.S. PATENT DOCUMENTS

| | | | |
|---|---|---|---|
| 8,596,042 B2 * | 12/2013 | Parmentier | F01N 3/208 60/275 |
| 2011/0202253 A1 * | 8/2011 | Perry | F01N 3/035 60/274 |

(Continued)

FOREIGN PATENT DOCUMENTS

| | | |
|---|---|---|
| WO | 2014112311 A1 | 7/2014 |
| WO | 2017034463 A1 | 3/2017 |
| WO | 2019025870 A1 | 2/2019 |

OTHER PUBLICATIONS

Extended European Search Report for European Patent Application No. 21171411.8, dated Sep. 23, 2021, 5 pages.

*Primary Examiner* — Binh Q Tran
(74) *Attorney, Agent, or Firm* — Sage Patent Group

(57) ABSTRACT

A method for reducing deposits related to a reduction agent (RA) in a portion of an exhaust aftertreatment system (EAS) of an internal combustion engine (ICE) and comprising an injector for injecting the RA into said EAS, said portion located downstream of said injector, as seen in an intended direction of flow of exhaust gas in said EAS, said method comprising:
 identifying for said ICE, a future operating sequence (FOS) comprising a first temporal portion ($t_1$) and a second temporal portion ($t_2$) subsequent to $t_1$,
 confirming that said FOS is suitable for reducing deposits and that said ICE operates in accordance with said FOS,
 in response to said confirming being affirmative, injecting a first dosage ($d_1$) of RA into said EAS during at least a part of said $t_1$ and injecting a second dosage ($d_2$) of RA smaller than $d_1$ into said EAS during at least a part of $t_2$.

16 Claims, 4 Drawing Sheets

(52) U.S. Cl.
CPC .... *F01N 2610/02* (2013.01); *F01N 2610/146* (2013.01); *F01N 2900/0402* (2013.01); *F01N 2900/0406* (2013.01); *F01N 2900/0601* (2013.01); *F01N 2900/08* (2013.01); *F01N 2900/10* (2013.01); *F01N 2900/1602* (2013.01)

(56) References Cited

U.S. PATENT DOCUMENTS

| | | | |
|---|---|---|---|
| 2012/0137663 A1* | 6/2012 | Lee | F01N 3/0814 60/287 |
| 2015/0218993 A1* | 8/2015 | Chavannavar | F01N 3/208 422/111 |
| 2016/0201533 A1* | 7/2016 | Upadhyay | F01N 9/002 60/274 |
| 2017/0030243 A1* | 2/2017 | Li | F01N 9/007 |
| 2019/0292970 A1* | 9/2019 | Ikedo | F01N 3/101 |
| 2020/0063632 A1* | 2/2020 | Hendrickson | F01N 3/2066 |

\* cited by examiner

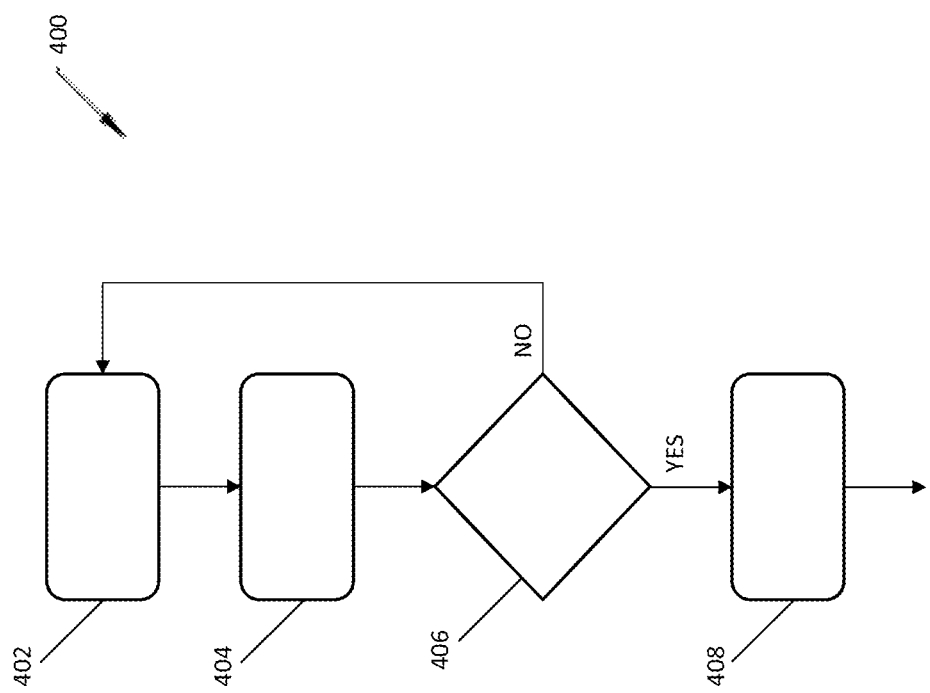

METHOD FOR REDUCING DEPOSITS RELATED TO A REDUCTION AGENT IN A PORTION OF AN EXHAUST AFTERTREATMENT SYSTEM

CROSS-REFERENCE TO RELATED APPLICATIONS

This application claims priority to European Application No. EP 21171411.8 filed on Apr. 30, 2021, the disclosure and content of which is incorporated by reference herein in its entirety.

TECHNICAL FIELD

The present invention relates to a method for reducing deposits related to a reduction agent in a portion of an exhaust aftertreatment system of an internal combustion engine, a control unit adapted to perform the method, an exhaust aftertreatment system comprising the control unit and a vehicle comprising the control unit and/or the exhaust aftertreatment system.

The invention can be applied in all kinds of applications using an internal combustion engine, such as trucks, buses, marine vessels, industrial construction machines, construction equipment, and passenger cars. Although the invention will be described with respect to a truck, the invention is not restricted to a method for use in this particular vehicle but may also be used in other applications, e.g., in vehicles such as buses, passenger cars, marine vessels, industrial construction machines, and construction equipment. Examples of the latter may be wheel loaders, excavators, backhoe loaders, or articulated haulers. The invention is further applicable for any internal combustion engine with an exhaust aftertreatment system, for instance stationary internal combustion engines. The term "stationary internal combustion engine" as used herein relates to any application in which the internal combustion engine is not primarily used for propulsion, but for power generation. Examples of such applications may be power generation engines, genset engines, back-up power supply engines, industrial engines, or engines used in stationary machinery, such as rock crushers.

BACKGROUND

Due to environmental concerns and legal demands, in applications using an internal combustion engine, it is desired to lower the fuel consumption and to reduce emissions such as carbon dioxide ($CO_2$) and nitrogen oxides ($NO_x$). To maximize fuel efficiency and minimize $CO_2$ emissions, combustion is generally calibrated to high engine-out $NO_x$ emissions. The $NO_x$ emissions are reduced in an exhaust aftertreatment system, so that the overall emissions from the internal combustion engine and the exhaust aftertreatment system meet the demands One common way of reducing $NO_x$ includes a step of injecting a reduction agent, such as an aqueous urea solution, into the exhaust aftertreatment system. The reduction agent operates with a component of the exhaust aftertreatment system, e.g., a selective catalytic reduction catalyst, to reduce the amount of $NO_x$.

Under ideal conditions, the urea is decomposed in the exhaust gas stream to ammonia, $NH_3$. However, the decomposition of urea is largely affected by the temperature in the exhaust aftertreatment system, in particular the temperature in the portion of the exhaust aftertreatment system where the reduction agent is injected, and during some operating conditions the reduction agent is not fully decomposed. This may lead to accumulation of reduction agent related by-products in the liquid phase or solid phase on the inner walls of the exhaust aftertreatment system. The liquid phase may consist of e.g. molten reduction agent and biuret, while solid deposits may consist of e.g. cyanuric acid and ammelide. If excessive solid deposits related to the reduction agent are accumulated in the exhaust aftertreatment system, the performance of the exhaust aftertreatment system is deteriorated, which may lead to too high $NO_x$ emissions, increased reduction agent consumption and poor fuel economy. In the present context, the term deposits is used to denote reduction agent related by-products in both the liquid phase and solid phase.

SUMMARY

In view of the above, an object of the present invention is to provide a method for reducing deposits related to a reduction agent in a portion of an exhaust aftertreatment system of an internal combustion engine, by which method the deposits related to a reduction agent can be reduced in an appropriate manner.

According to a first aspect of the invention, the object is achieved by a method for reducing deposits related to a reduction agent in a portion of an exhaust aftertreatment system of an internal combustion engine according to claim 1. The exhaust aftertreatment system comprises an injector for injecting the reduction agent into the exhaust aftertreatment system, and the portion of the exhaust aftertreatment system is located downstream of the injector, as seen in an intended direction of flow of exhaust gas in the exhaust aftertreatment system. The method comprises the steps of:
  identifying a future operating sequence for the internal combustion engine. The future operating sequence comprises a first temporal portion and a second temporal portion, the second temporal portion being subsequent to the first temporal portion.
  performing a confirmation procedure comprising:
    confirming that the future operating sequence is suitable for reducing the deposits and
    confirming that the internal combustion engine operates in accordance with the precedingly identified future operating sequence.
  in response to the confirmation procedure being affirmative, executing a deposit removal dosage procedure. The deposit removal dosage procedure comprises controlling the injector such that a first dosage of reduction agent is injected into the exhaust aftertreatment system during at least a part of the first temporal portion and that a second dosage of reduction agent is injected into the exhaust aftertreatment system during at least a part of the second temporal portion, the second dosage being smaller than the first dosage.

By executing the deposit removal dosage procedure in response to having identified a future operating sequence for the internal combustion engine and having confirmed that it is suitable for reducing the deposits, any deposits related to the reduction agent can be reduced in an appropriate manner By way of example, the build-up of deposits related to a reduction agent in the portion of the exhaust aftertreatment system can be reduced, possibly even avoided, without negatively affecting the fuel efficiency of the internal combustion engine. As a further example, when the internal combustion is used in a vehicle, deposits related to a reduction agent may be reduced without negatively affecting the driveability of the vehicle. As yet a further example, the uptime of the internal combustion engine may be improved, as the need for regeneration events during engine idle may be reduced.

Optionally, a ratio between the second dosage and a maximum dosage that can be injected by the injector is less than 0.05, preferably less than 0.03, more preferably less than 0.02, most preferably less than 0.01.

Optionally, a ratio between the second dosage and the first dosage is less than 0.05, preferably less than 0.03, more preferably less than 0.02, most preferably less than 0.01.

A low dosage of reduction agent injected by the injector provides a lesser cooling effect in the portion of the exhaust aftertreatment system located downstream of the injector than a high dosage. Thus, as the second dosage is low, more specifically significantly lower than the maximum dosage of the injector and/or than the first dosage, the temperature in the portion of the exhaust aftertreatment system can be kept high or be allowed to increase in response to the operating sequence of the internal combustion engine. Such temperature will allow for more efficient removal of deposits, which may incorporate reduction agent related by-products in both the liquid phase and solid phase. In addition, by injecting the second, low, dosage during at least a part of the second temporal portion, the risk of deposits building up in the portion of the exhaust aftertreatment system is reduced. The term "dosage" as used herein refers to amount of reduction agent per time unit. The dosage may be controlled by, e.g., adjusting the number of injections per time unit, or adjusting the duration of each injection.

Optionally, the first dosage of the reduction agent is such that a ratio between an actual reductant buffer and a maximum reductant buffer at a current operating condition in a selective catalytic reduction catalyst located downstream the portion of the exhaust aftertreatment system is within the range of 0.2 to 0.6, preferably 0.3 to 0.5, more preferably 0.4 to 0.5.

By adapting the first dosage of the reduction agent so that the ratio between the actual reductant buffer and the maximum reductant buffer will be kept within a desired range, at each current operating condition throughout the precedingly identified future operating sequence, the efficiency of the selective catalytic reduction catalyst can be maintained during at least the first and the second temporal portion. This implies that, at each current operating condition, the reductant buffer in the catalyst is sufficient to ensure satisfactory emission performance, while saturation of the reductant buffer in the catalyst, which may lead to unwanted emission species, e.g. ammonia, passing through the selective catalytic reduction catalyst, is prevented.

Optionally, the future operating sequence is determined to be suitable for reducing the deposits if a ratio between an estimated workload of the internal combustion engine in the first temporal portion and the estimated workload in the second temporal portion is at least 1.5, preferably at least 2.

Optionally, a ratio between the estimated workload in the second temporal portion and the maximum workload of the internal combustion engine is less than 0.5.

By executing the deposit removal dosage procedure at an identified future operating sequence in which the estimated workload in the first temporal portion is significantly higher than the estimated workload in the second temporal portion and, purely by way of example, in which the estimated workload in the second temporal portion is significantly lower than the maximum workload of the internal combustion engine, the removal of deposits is achieved in an appropriate manner By way of example, the removal of deposits may be achieved without negatively affecting the fuel efficiency of the internal combustion engine. By identifying a period of high workload followed by a period of low workload and by controlling the injection of reduction agent to be significantly lower during at least a part of the period of low workload, the temperature in the exhaust aftertreatment system is allowed to increase to a temperature at which any deposits in the portion of the exhaust aftertreatment system can be efficiently removed. The low workload at the second temporal portion implies that the second dosage may be low while nevertheless ensuring sufficient remaining buffer level in the selective catalytic reduction catalyst so that the emissions from the exhaust aftertreatment system are maintained at a satisfactory level.

Optionally, the method further comprises a step of identifying a deposits parameter indicative of a level of deposits in the portion of the exhaust aftertreatment system and the confirmation procedure further comprises:

confirming that the level of deposits is equal to or exceeds a predeterminable threshold.

By identifying if the level of deposits is equal to or exceeds a predeterminable threshold, the deposit removal dosage procedure can be controlled to be executed only when there is a need for removal of deposits. The deposits parameter may be indicative of a level of liquid and/or solid deposits.

Optionally, the method further comprises identifying a temperature parameter indicative of a temperature of the portion of the exhaust aftertreatment system. The deposit removal dosage procedure is performed in dependence on the temperature parameter, preferably the initiation of the second dosage is dependent on the temperature parameter.

Optionally, the second dosage is initiated in response to detecting that the temperature parameter has a temperature increase rate at or below a predetermined increase rate threshold.

Optionally, the temperature of the portion of the exhaust aftertreatment system is a temperature of a wall portion of the portion of the exhaust aftertreatment system.

By identifying a temperature parameter indicative of a temperature of the portion of the exhaust aftertreatment system, which may, purely by way of example, be a temperature of a wall portion of the portion of the exhaust aftertreatment system, and performing the deposit removal dosage procedure in dependence on the temperature parameter, the efficiency of the deposit removal can be ensured. Purely by way of example, the second dosage can be initiated when the temperature of the portion of the exhaust aftertreatment system is at or near a peak value of the precedingly identified future operating sequence. As discussed above, the temperature in the portion of the exhaust aftertreatment system can thus be kept high or be allowed to increase, allowing for more efficient removal of deposits. The efficiency of the decomposition of reduction agent and/or the removal of liquid or solid deposits related to the reduction agent are largely correlated to the wall temperature of the portion of the exhaust aftertreatment system where dosing of the reduction agent takes place.

Optionally, the future operating sequence further comprises a third temporal portion, the third temporal portion being subsequent the second temporal portion, and the deposit removal dosage procedure further comprises controlling the injector such that a third dosage of reduction agent is injected into the exhaust aftertreatment system during at least a part of the third temporal portion. The third dosage is such that a ratio between an actual reductant buffer and a maximum reductant buffer at a current operating condition in a selective catalytic reduction catalyst located downstream the portion of the exhaust aftertreatment system is within the range of 0.2 to 0.6, preferably 0.3 to 0.5, more preferably 0.4 to 0.5.

At the second temporal portion, during at least a portion of which the second, lower, dosage is injected, the reductant buffer in the selective catalytic reduction catalyst is likely to decrease towards the lower end of a range in which efficiency of the selective catalytic reduction catalyst can be maintained. By controlling the injector to inject the third dosage during at least a part of the third temporal portion, the reductant buffer in the selective catalytic reduction catalyst can be restored to a desired range after having decreased at the second temporal portion.

Optionally, the internal combustion engine propels a vehicle, and the feature of identifying the future operating sequence and/or of confirming that the future operating sequence is suitable for reducing the deposits comprises confirming that the vehicle is predicted to be driven in at least one of the following driving conditions:
- uphill driving during at least a majority of said first temporal portion and level or downhill driving during at least a majority of said second temporal portion,
- acceleration during at least a majority of said first temporal portion and driving at constant speed or deceleration during at least a majority of said second temporal portion,
- entering a motorway during said first temporal portion and driving on said motorway during said second temporal portion,
- overtaking another vehicle during said first temporal portion and driving at constant speed or deceleration during said second temporal portion.

Each one of these driving conditions is likely to correspond to an operating sequence having a first temporal portion at which the workload of the internal combustion engine is high and a second temporal portion at which the workload of the internal combustion engine is low, thus being suitable performing the deposit removal dosage procedure. The above-described driving conditions are related to a vehicle, but it should be noted that also non-vehicle applications may show such a suitable future operating sequence.

Optionally, the vehicle comprises a route planning system, preferably comprising a GPS and/or a map database, and the feature of confirming that the vehicle is predicted to be driven in at least one of the driving conditions comprises using the route planning system.

The route planning system may facilitate the identification of the future operating sequence.

Optionally, the reduction agent is a reduction agent for $NO_x$ emissions, preferably an aqueous urea solution.

A $NO_x$ reduction agent generally cooperates with a catalyst and generally requires relatively high temperatures to be fully decomposed, thus making it suitable for the method of the invention.

A second aspect of the invention relates to a control unit according to claim 13. As such, the control unit is adapted for reducing deposits related to a reduction agent in a portion of an exhaust aftertreatment system of an internal combustion engine, the exhaust aftertreatment system comprising an injector for injecting the reduction agent into the exhaust aftertreatment system, and the portion of the exhaust aftertreatment system being located downstream of the injector, as seen in an intended direction of flow of exhaust gas in the exhaust aftertreatment system, the control unit being adapted to:
- identify a future operating sequence for the internal combustion engine, the future operating sequence comprising a first temporal portion and a second temporal portion, the second temporal portion being subsequent to the first temporal portion,
- perform a confirmation procedure comprising:
  - confirming that the future operating sequence is suitable for reducing the deposits and
  - confirming that the internal combustion engine operates in accordance with the precedingly identified future operating sequence,
- in response to the confirmation procedure being affirmative, execute a deposit removal dosage procedure comprising controlling the injector such that a first dosage of reduction agent is injected into the exhaust aftertreatment system during at least a part of the first temporal portion and that a second dosage of reduction agent is injected into the exhaust aftertreatment system during at least a part of the second temporal portion, the second dosage being smaller than the first dosage.

Effects and features of the second aspect of the invention are largely analogous to those described above in connection with the first aspect.

Optionally, a ratio between the second dosage and a maximum dosage that can be injected by the injector is less than 0.05, preferably less than 0.03, more preferably less than 0.02, most preferably less than 0.01.

Optionally, a ratio between the second dosage and the first dosage is less than 0.05, preferably less than 0.03, more preferably less than 0.02, most preferably less than 0.01.

Optionally, the control unit is adapted to adjust the first dosage of reduction agent such that a ratio between an actual reductant buffer in a selective catalytic reduction catalyst located downstream the portion of the exhaust aftertreatment system and a maximum reductant buffer in the selective catalytic reduction catalyst at a current operating temperature in the selective catalytic reduction catalyst is within the range of 0.2 to 0.6, preferably 0.3 to 0.5, more preferably 0.4 to 0.5.

Optionally, the future operating sequence is determined to be suitable for reducing the deposits if a ratio between an estimated workload of the internal combustion engine in the first temporal portion and the estimated workload in the second temporal portion is at least 1.5, preferably at least 2.

Optionally, a ratio between the estimated workload in the second temporal portion and the maximum workload of the internal combustion engine is less than 0.5.

Optionally, the control unit further is adapted to identify a deposits parameter indicative of a level of deposits in the portion of the exhaust aftertreatment system and wherein the confirmation procedure further comprises:
- confirming that the level of deposits is equal to or exceeds a predeterminable threshold.

Optionally, the control unit further is adapted to identify a temperature parameter indicative of a temperature of the portion of the exhaust aftertreatment system and wherein the control unit is adapted to perform the deposit removal dosage procedure in dependence on the temperature parameter, preferably the control unit is adapted to initiate the second dosage in dependence on the temperature parameter.

Optionally, the control unit is adapted to initiate the second dosage in response to detecting that the temperature parameter has a temperature increase rate at or below a predetermined increase rate threshold.

Optionally, the temperature of the portion of the exhaust aftertreatment system is a temperature of a wall portion of the portion of the exhaust aftertreatment system.

Optionally, the future operating sequence further comprises a third temporal portion, the third temporal portion being subsequent the second temporal portion, and wherein the deposit removal dosage procedure further comprises controlling the injector such that a third dosage of reduction agent is injected into the exhaust aftertreatment system during at least a part of the third temporal portion, the control unit being adapted to adjust the third dosage such a ratio between an actual reductant buffer and a maximum reductant buffer at a current operating condition in a selective catalytic reduction catalyst located downstream the portion of the exhaust aftertreatment system is within the range of 0.2 to 0.6, preferably 0.3 to 0.5, more preferably 0.4 to 0.5.

Optionally, the internal combustion engine propels a vehicle and the feature of identifying the future operating sequence and/or of confirming that the future operating sequence is suitable for reducing the deposits comprises confirming that the vehicle is predicted to be driven in at least one of the following driving conditions:
- uphill driving during at least a majority of said first temporal portion and level or downhill driving during at least a majority of said second temporal portion,
- acceleration during at least a majority of said first temporal portion and driving at constant speed or deceleration during at least a majority of said second temporal portion,
- entering a motorway during said first temporal portion and driving on said motorway during said second temporal portion,
- overtaking another vehicle during said first temporal portion and driving at constant speed or deceleration during said second temporal portion.

Optionally, the vehicle comprises a route planning system, preferably comprising a GPS and/or a map database, and wherein the feature of confirming that the vehicle is predicted to be driven in at least one of the driving conditions comprises using the route planning system, preferably the control unit is adapted to receive information from the route planning system.

Optionally, the reduction agent is a reduction agent for NOx emissions, preferably an aqueous urea solution.

A third aspect of the invention relates to an exhaust aftertreatment system for an internal combustion engine according to claim 14. The exhaust aftertreatment system comprises a source of reduction agent, the source being in fluid connection with an injector, the injector being adapted to inject the reduction agent into a portion of the exhaust aftertreatment system, the portion of the exhaust aftertreatment system being located downstream of the injector, as seen in an intended direction of flow of exhaust gas in the exhaust aftertreatment system, the exhaust aftertreatment system comprising a control unit according to the second aspect of the present invention, the control unit being adapted to issue a signal to the injector in order to control a dosage of reduction agent from the injector.

Effects and features of the third aspect of the invention are largely analogous to those described above in connection with the first and second aspects.

A fourth aspect of the invention relates to a vehicle according to claim 15. The vehicle comprises a control unit according to the second aspect of the invention and/or an exhaust aftertreatment system according to the third aspect of the invention.

Effects and features of the fourth aspect of the invention are largely analogous to those described above in connection with the first, second and third aspects.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings:

FIG. 4 is a flowchart illustrating an embodiment of the method of the invention.

DETAILED DESCRIPTION OF EXAMPLE EMBODIMENTS OF THE INVENTION

In the present detailed description, embodiments of the present invention are mainly described with reference to a vehicle in the form of a truck 100 comprising an internal combustion engine 102 such as the truck illustrated in FIG. 1. However, it should be noted that various embodiments of the described invention are equally applicable for a wide range of vehicles and vessels, as well as for stationary applications.

Figure 1:
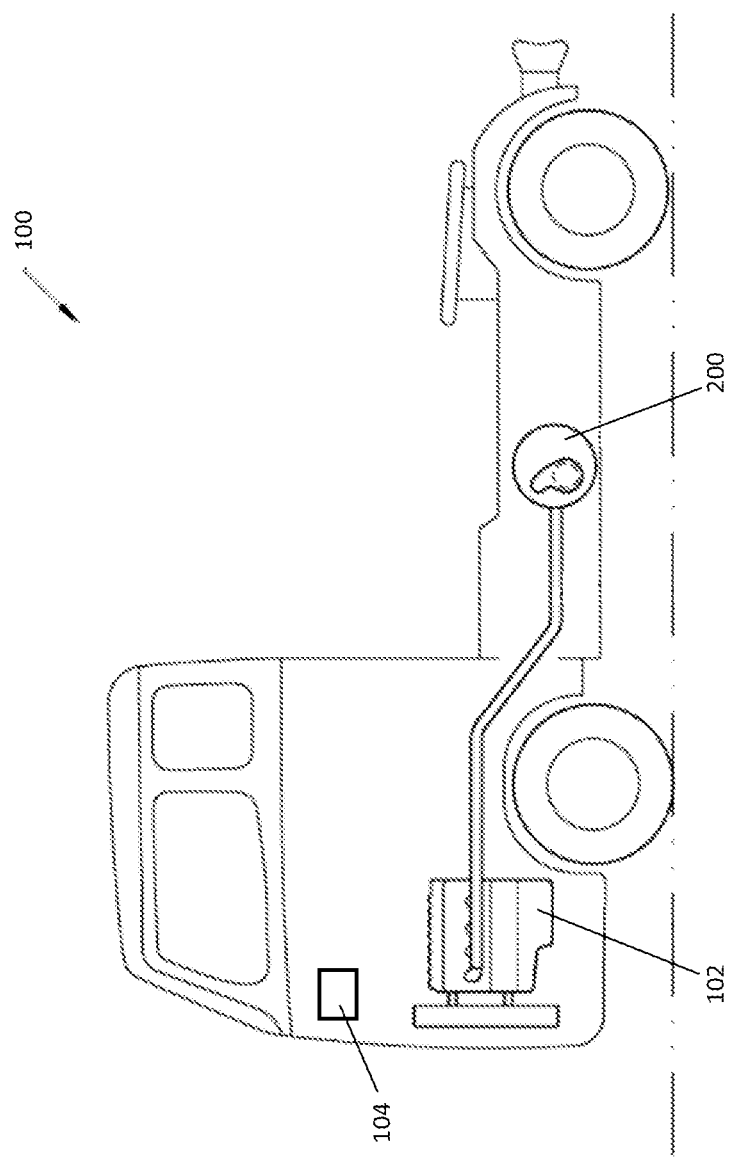
FIG. 1 is a schematic drawing illustrating a vehicle.

FIG. 1 shows a simplified side-view of a vehicle, in the form of a truck 100, which is equipped with an internal combustion engine 102. The internal combustion engine 102 may be the single prime mover for propelling the truck 100, or it may be comprised in a drive system comprising at least two engines and/or motors, such as electric motors. The internal combustion engine 102 runs on fuel, for instance diesel fuel, which is supplied to the internal combustion engine 102 by means of a fuel supply system (not shown).

Purely by way of example, the truck 100 may comprise a route planning system 104, which will be presented more in detail below.

The exhaust gas which is emitted as a result of the combustion of fuel in the internal combustion engine 102 flows into an exhaust aftertreatment system 200, where the exhaust gas is purified to at least a certain extent and/or rendered innocuous.

Figure 2:
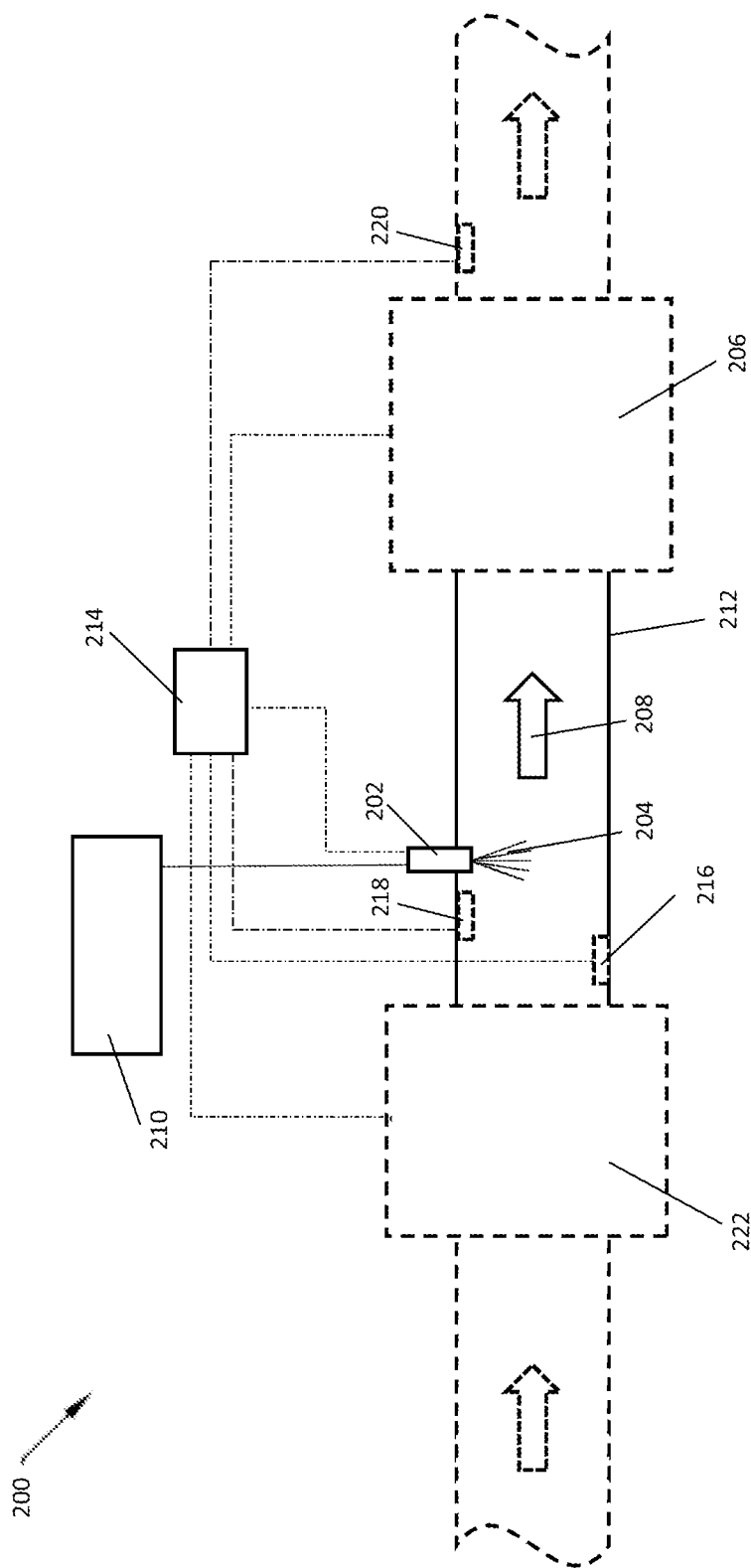
FIG. 2 is a schematic drawing illustrating an exhaust aftertreatment system.

An example embodiment of an exhaust aftertreatment system is schematically shown in FIG. 2. As may be gleaned from FIG. 2, the exhaust aftertreatment system comprises an injector 202 for injecting a reduction agent 204 into the exhaust aftertreatment system 200. Preferably, the injector 202 injects the reduction agent 204 upstream an aftertreatment component 206. Upstream as used herein refers to upstream as seen in an intended direction of flow 208 of the exhaust gas in the exhaust aftertreatment system 200.

The injector 202 may be positioned to inject the reduction agent 204 in a direction substantially perpendicular to the intended direction of flow 208 of exhaust gas in the exhaust aftertreatment system 200, as schematically illustrated in FIG. 2. However, the injector 202 may alternatively be positioned to inject the reduction agent 204 at an angle to the intended direction of flow 208 of exhaust gas.

It is also conceivable that the exhaust aftertreatment system may comprise a plurality of injectors. For instance, the exhaust aftertreatment system may comprise a plurality of injectors injecting the reduction agent 204 upstream the aftertreatment component 206 and/or the exhaust aftertreatment system may comprise a plurality of aftertreatment components and a plurality of injectors each injecting a reduction agent upstream of a respective aftertreatment component.

Preferably, the reduction agent 204 may be a reduction agent for $NO_x$ emissions, most preferably the reduction agent is an aqueous urea solution.

The reduction agent 204 comes from a source 210 of reduction agent 204, which source 210 is in fluid communication with the injector 202. Purely by way of example, the source 210 may be implemented as a tank adapted to contain the reduction agent 204. It should be noted that the setup in FIG. 2, showing that the source 210 may be located near the injector 202, is purely intended for illustrational purposes and should in no way be construed as limiting for the invention. Any other position of the source 210 is feasible, as long as it is in fluid communication with the injector 202.

The exhaust aftertreatment system further comprises a portion 212 located downstream of the injector 202. Downstream as used herein refers to downstream as seen in the intended direction of flow 208 of the exhaust gas in the exhaust aftertreatment system 200. Purely by way of example, the portion 212 may be a portion of a pipe designed for optimum spray propagation from the injector 202 and efficient decomposition of the reduction agent 204 before reaching the aftertreatment component 206. Although the pipe in FIG. 2 is exemplified as being straight, it is envisaged that the pipe may have other shapes, e.g. bent.

By way of example, the aftertreatment component 206, which may be, e.g., a selective catalytic reduction catalyst 206, may be located downstream the portion 212 of the exhaust aftertreatment system 200. Purely by way of example, the aftertreatment component 206 may utilize the reduction agent 204 when treating the exhaust gases.

Further, the exhaust aftertreatment system comprises a control unit 214. Even though the control unit 214 functionally is comprised in the exhaust aftertreatment system 200, it is not necessarily physically comprised therein. Instead, the control unit 214 may be located anywhere outside of the exhaust aftertreatment system 200, such as on the truck 100, as long as the control unit 214 is operationally connected to the exhaust aftertreatment system 200.

The control unit 214 is adapted to issue control signals to one or more components of the exhaust aftertreatment system to thereby reduce deposits related to the reduction agent 204 in the portion 212 of the exhaust aftertreatment system of the internal combustion engine (not shown in FIG. 2). More specifically, the control unit 214 is adapted to issue a signal to the injector 202 to control the dosage of the reduction agent 204 from the injector 202. It should be noted that features of the control unit 214 as presented hereinbelow are equally applicable to a method for reducing deposits related to the reduction agent 204 in the portion 212 of the exhaust aftertreatment system of the internal combustion engine 102.

Further, as a non-limiting example, the exhaust aftertreatment system may comprise a temperature sensor 216 configured to sense a temperature in the portion 212 of the exhaust aftertreatment system and provide signal input to the control unit 214. The temperature may be a temperature of a wall portion of the portion 212 of the exhaust aftertreatment system 200. Preferably, the temperature sensor 216 may be located at an inlet of the portion 212 of the exhaust aftertreatment system 200. More preferably, the temperature sensor 216 may be located upstream the injector 202. It is conceivable that the exhaust aftertreatment system may comprise a plurality of temperature sensors.

Purely by way of example, the exhaust aftertreatment system may comprise additional sensors, such as a first $NO_x$ sensor 218, providing a signal input to the control unit 214. Additionally, a second $NO_x$ sensor 220 may be positioned downstream the selective catalytic reduction catalyst 206, providing signal input to the control unit 214.

Further, as a non-limiting example, the exhaust aftertreatment system may comprise further aftertreatment components, such as a diesel particulate filter 222, which may be located upstream the portion 212 of the exhaust aftertreatment system 200.

Figure 3:
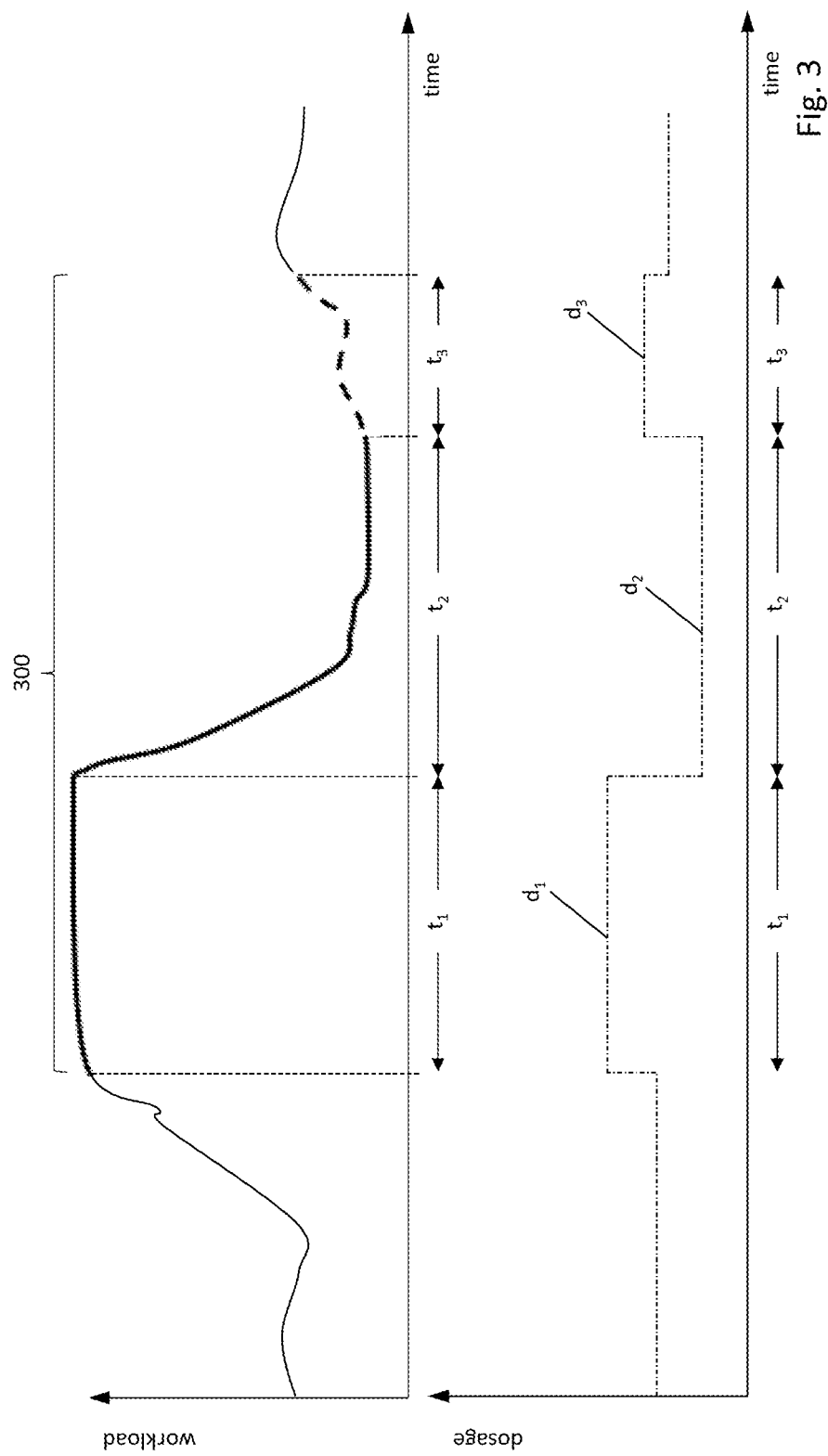
FIG. 3. is a schematic illustration of an implementation of the invention.

The control unit 214 is further adapted to identify a future operating sequence 300 for the internal combustion engine 102. Depending on the application of the internal combustion engine 102, such an identification may be carried out in a plurality of different ways, such as, e.g., by assessing a future operating scheme for the internal combustion engine 102. As may be gleaned from FIG. 3, the future operating sequence comprises a first temporal portion $t_1$ and a second temporal portion $t_2$, the second temporal portion $t_2$ being subsequent the first temporal portion $t_1$. Optionally, the future operating sequence 300 may comprise also a third temporal portion $t_3$, subsequent the second temporal portion $t_2$.

Further, the control unit 214 is adapted to perform a confirmation procedure. The confirmation procedure comprises confirming that the future operating sequence 300 is suitable for reducing deposits and confirming that the internal combustion engine 102 operates in accordance with the precedingly identified future operating sequence 300.

Purely by way of example, the future operating sequence 300 may be determined to be suitable for reducing deposits if a ratio between an estimated workload of the internal combustion engine 102 in the first temporal portion $t_1$ and the estimated workload in the second temporal portion $t_2$ is at least 1.5, preferably at least 2. By way of example, the estimated workloads may be determined by calculating the average workload for each temporal portion $t_1$, $t_2$. Optionally, for the future operating sequence 300 to be determined as suitable for reducing deposits, it may also be required that a ratio between the estimated workload in the second temporal portion $t_2$ and a maximum workload of the internal combustion engine 102 is less than 0.5.

According to one embodiment, when the internal combustion engine 102 is adapted to propel a vehicle such as the FIG. 1 truck 100, the feature of confirming that the future operating sequence 300 is suitable for reducing deposits may comprise confirming that the truck 100 is predicted to be driven in at least one of the following driving conditions:

uphill driving during at least a majority of the first temporal portion $t_1$ and level or downhill driving during at least a majority of the second temporal portion $t_2$, acceleration during at least a majority of said first temporal portion $t_1$ and driving at constant speed or deceleration during at least a majority of said second temporal portion $t_2$, entering a motorway during said first temporal portion $t_1$ and driving on said motorway during said second temporal portion $t_2$, overtaking another vehicle during said first temporal portion $t_1$ and driving at constant speed or deceleration during said second temporal portion $t_2$.

Purely by way of example, the control unit 214 may be adapted to receive information from the route planning system 104. Preferably, the route planning system 104 may comprise a map database and/or a satellite-based radionavigation system, such as, e.g., GPS or GLONASS. The map database, if provided, may be provided in the truck 100, or may be provided externally, such as in a cloud-based service. The feature of confirming that the vehicle is predicted to be driven in at least one of the driving conditions above may comprise using the route planning system 104.

For a stationary application, the control unit 214 may be adapted to receive, e.g., information about a scheduled work cycle for the internal combustion engine 102. Purely by way of example, if the internal combustion engine is used in a stationary machinery such as a rock crusher, the control unit 214 may be adapted to receive information from working machines supplying rocks to the crusher about their estimated arrival times and their load.

The control unit 214 is further adapted to, in response to the confirmation procedure being affirmative, execute a deposit removal dosage procedure. The deposit removal procedure comprises controlling the injector 202, more specifically its dosage of reduction agent 204. Thus, the injector 202 is controlled such that a first dosage $d_1$ of reduction agent 204 is injected into the exhaust aftertreatment system during at least a part of the first temporal portion $t_1$ and such that a second dosage $d_2$ of reduction agent 204 is injected into the exhaust aftertreatment system during at least a part of the second temporal portion $t_2$, wherein the second dosage $d_2$ is smaller than the first dosage $d_1$.

Purely by way of example, a ratio between the second dosage $d_2$ and a maximum dosage that can be injected by the injector 202 may be less than 0.05, preferably less than 0.03, more preferably less than 0.02, most preferably less than 0.01.

By way of example, a ratio between the second dosage $d_2$ and the first dosage $d_1$ may be less than 0.05, preferably less than 0.03, more preferably less than 0.02, most preferably less than 0.01.

By way of example, the control unit 214 may be adapted to adjust the first dosage $d_1$ of reduction agent 204 such that a ratio between an actual reductant buffer in the selective catalytic reduction catalyst 206 and a maximum reductant buffer in the selective catalytic reduction catalyst 206 at a current operating temperature in the selective catalytic reduction catalyst 206 is within the range of 0.2 to 0.6, preferably 0.3 to 0.5, more preferably 0.4 to 0.5.

By way of example, the control unit 214 may further be adapted to adjust a third dosage $d_3$ of reduction agent 204 as a part of the deposit removal dosage procedure. Preferably, the injector 202 may be controlled such that the third dosage $d_3$ is injected into the exhaust aftertreatment system during at least a part of the third temporal portion $t_3$, and the control unit 214 may be adapted to adjust the third dosage $d_3$ such that ratio between an actual reductant buffer and a maximum reductant buffer at a current operating condition in the selective catalytic reduction catalyst 206 is within the range of 0.2 to 0.6, preferably 0.3 to 0.5, more preferably 0.4 to 0.5.

The maximum reductant buffer in the selective catalytic reduction catalyst 206 is dependent on the operating temperature of the catalyst 206, and may be known from, e.g., models of the exhaust aftertreatment system 200, look-up tables, and/or empirical data. Further, and purely by way of example, the actual reductant buffer may be estimated based on the precedingly identified future operating sequence 300, in conjunction with any other operating data from the internal combustion engine 102 and/or the exhaust aftertreatment system 200, as well as data from the above-mentioned models of the exhaust aftertreatment system 200, look-up tables, and/or empirical data.

Purely by way of example, the control unit 214 may be adapted to identify a deposits parameter indicative of a level of deposits in the portion 212 of the exhaust aftertreatment system 200. The deposits parameter may be indicative of a level of liquid and/or solid deposits. Purely by way of example, the confirmation procedure may comprise confirming that the level of deposits is equal to or exceeds a predeterminable threshold. The deposits parameter may be estimated based on future and/or historical operating data from the internal combustion engine 102 and/or the exhaust aftertreatment system 200, as well as on data from models of the exhaust aftertreatment system 200, look-up tables, and/or empirical data.

By way of example, the control unit 214 may be adapted to identify a temperature parameter indicative of a temperature of the portion 212 of the exhaust aftertreatment system 200. Preferably, the control unit may be adapted to receive information from the temperature sensor 216. According to one exemplary embodiment, the control unit 214 may be adapted to perform the deposit removal procedure in dependence on the temperature parameter. Preferably, the control unit 214 may be adapted to initiate the second dosage $d_2$ in dependence on the temperature parameter, in particular to initiate the second dosage $d_2$ in response to detecting that the temperature parameter has a temperature increase rate at or below a predetermined increase rate threshold.

The above operation of the control unit 214 and the method associated therewith are schematically exemplified in FIG. 4. As such, the method 400 comprises the steps of:
402: Identifying the future operating sequence 300.
404: Performing the confirmation procedure.
406: Checking if the confirmation procedure of step 404 is affirmative or not.
408: If the confirmation procedure of step 404 is affirmative, executing the deposit removal dosage procedure.

As non-limiting examples, embodiments of the invention may be defined in accordance with any one of the below points.

1. A method (400) for reducing deposits related to a reduction agent (204) in a portion (212) of an exhaust aftertreatment system (200) of an internal combustion engine (102), said exhaust aftertreatment system (200) comprising an injector (202) for injecting the reduction agent (204) into said exhaust aftertreatment system (200), and said portion (212) of said exhaust aftertreatment system (200) being located downstream of said injector (202), as seen in an intended direction of flow (208) of exhaust gas in said exhaust aftertreatment system (200), said method comprising the steps of:
a) identifying a future operating sequence (300) for said internal combustion engine (102), said future operating sequence (300) comprising a first temporal portion ($t_1$) and a second temporal portion ($t_2$), said second temporal portion ($t_2$) being subsequent to said first temporal portion ($t_1$),
b) performing a confirmation procedure comprising:
confirming that said future operating sequence (300) is suitable for reducing said deposits and
confirming that said internal combustion engine (102) operates in accordance with said precedingly identified future operating sequence (300),
c) in response to said confirmation procedure being affirmative, executing a deposit removal dosage procedure comprising controlling said injector (202) such that a first dosage ($d_1$) of reduction agent (204) is injected into said exhaust aftertreatment system (200) during at least a part of said first temporal portion ($t_1$) and that a second dosage ($d_2$) of reduction agent (204) is injected into said exhaust aftertreatment system (200) during at least a part of said second temporal portion ($t_2$) said second dosage ($d_2$) being smaller than said first dosage ($d_1$).

2. The method (400) according to point 1, wherein a ratio between said second dosage ($d_2$) and a maximum dosage that can be injected by the injector (202) is less than 0.05, preferably less than 0.03, more preferably less than 0.02, most preferably less than 0.01.

3. The method (400) according to point 1 or 2, wherein a ratio between said second dosage ($d_2$) and said first dosage ($d_1$) is less than 0.05, preferably less than 0.03, more preferably less than 0.02, most preferably less than 0.01.

4. The method (400) according to any one of the preceding points, wherein said first dosage ($d_1$) of said reduction agent (204) is such that a ratio between an actual reductant buffer and a maximum reductant buffer at a current operating condition in a selective catalytic reduction catalyst (206) located downstream said portion (212) of said exhaust aftertreatment system (200) is within the range of 0.2 to 0.6, preferably 0.3 to 0.5, more preferably 0.4 to 0.5.

5. The method (400) according to any of the preceding points, wherein said future operating sequence (300) is determined to be suitable for reducing said deposits if a ratio between an estimated workload of said internal combustion engine in said first temporal portion ($t_1$) and the estimated workload in the second temporal portion ($t_2$) is at least 1.5, preferably at least 2.

6. The method (400) according to point 5, wherein a ratio between said estimated workload in the second temporal portion ($t_2$) and said maximum workload of said internal combustion engine is less than 0.5.

7. The method (400) according to any of the preceding points, wherein said method further comprises a step of identifying a deposits parameter indicative of a level of deposits in said portion (212) of said exhaust aftertreatment system (200) and wherein said confirmation procedure further comprises:
    confirming that said level of deposits is equal to or exceeds a predeterminable threshold.

8. The method (400) according to any of the preceding points, wherein said method further comprises identifying a temperature parameter indicative of a temperature of said portion (212) of said exhaust aftertreatment system (200) and wherein said deposit removal dosage procedure is performed in dependence on said temperature parameter, preferably the initiation of said second dosage ($d_2$) is dependent on said temperature parameter.

9. The method (400) according to point 8, wherein said second dosage ($d_2$) is initiated in response to detecting that said temperature parameter has a temperature increase rate at or below a predetermined increase rate threshold.

10. The method (400) according to point 8 or 9, wherein said temperature of said portion (212) of said exhaust aftertreatment system (200) is a temperature of a wall portion of said portion (212) of said exhaust aftertreatment system (200).

11. The method (400) according to any of the preceding points, wherein said future operating sequence (300) further comprises a third temporal portion ($t_3$), said third temporal portion ($t_3$) being subsequent said second temporal portion ($t_2$), and wherein said deposit removal dosage procedure further comprises controlling said injector (202) such that a third dosage ($d_3$) of reduction agent (204) is injected into said exhaust aftertreatment system (200) during at least a part of said third temporal portion ($t_3$), said third dosage ($d_3$) being such that a ratio between an actual reductant buffer and a maximum reductant buffer at a current operating condition in a selective catalytic reduction catalyst (206) located downstream said portion (212) of said exhaust aftertreatment system (200) is within the range of 0.2 to 0.6, preferably 0.3 to 0.5, more preferably 0.4 to 0.5.

12. The method (400) according to any of the preceding points, wherein said internal combustion engine (102) propels a vehicle (100) and wherein said feature of confirming that said future operating sequence (300) is suitable for reducing said deposits comprises confirming that said vehicle (100) is predicted to be driven in at least one of the following driving conditions:
    uphill driving during at least a majority of said first temporal portion ($t_1$) and level or downhill driving during at least a majority of said second temporal portion ($t_2$),
    acceleration during at least a majority of said first temporal portion ($t_1$) and driving at constant speed or deceleration during at least a majority of said second temporal portion ($t_2$),
    entering a motorway during said first temporal portion ($t_1$) and driving on said motorway during said second temporal portion ($t_2$),
    overtaking another vehicle during said first temporal portion ($t_1$) and driving at constant speed or deceleration during said second temporal portion ($t_2$).

13. The method (400) according to point 12, wherein said vehicle (100) comprises a route planning system (104), preferably comprising a GPS and/or a map database, and wherein said feature of confirming that said vehicle (100) is predicted to be driven in at least one of said driving conditions comprises using said route planning system (104).

14. The method (400) according to any of the preceding points, wherein said reduction agent (204) is a reduction agent for NOx emissions, preferably an aqueous urea solution.

15. A control unit (214) adapted for reducing deposits related to a reduction agent (204) in a portion (212) of an exhaust aftertreatment system (200) of an internal combustion engine (102), said exhaust aftertreatment system (200) comprising an injector (202) for injecting said reduction agent (204) into said exhaust aftertreatment system (200), and said portion (212) of said exhaust aftertreatment system (200) being located downstream of said injector (202), as seen in an intended direction of flow (208) of exhaust gas in said exhaust aftertreatment system (200), said control unit (214) being adapted to:
    identify a future operating sequence (300) for said internal combustion engine (102), said future operating sequence (300) comprising a first temporal portion ($t_1$) and a second temporal portion ($t_2$), said second temporal portion ($t_2$) being subsequent to said first temporal portion ($t_1$),
    perform a confirmation procedure comprising:
        confirming that said future operating sequence (300) is suitable for reducing said deposits and confirming that said internal combustion engine (102) operates in accordance with said precedingly identified future operating sequence (300), in response to said confirmation procedure being affirmative, execute a deposit removal dosage procedure comprising controlling said injector (202) such that a first dosage ($d_1$) of reduction agent (204) is injected into said exhaust aftertreatment system (200) during at least a part of said first temporal portion ($t_1$) and that a second dosage ($d_2$) of reduction agent (204) is injected into said exhaust aftertreatment system (200) during at least a part of said second temporal portion ($t_2$), said second dosage ($d_2$) being smaller than said first dosage ($d_1$).

16. The control unit (214) according to point 15, wherein a ratio between said second dosage ($d_2$) and a maximum dosage that can be injected by the injector (202) is less than 0.05, preferably less than 0.03, more preferably less than 0.02, most preferably less than 0.01.

17. The control unit (214) according to point 15 or 16, wherein a ratio between said second dosage ($d_2$) and said first dosage ($d_1$) is less than 0.05, preferably less than 0.03, more preferably less than 0.02, most preferably less than 0.01.

18. The control unit (214) according to any of points 15 to 17, wherein said control unit (214) is adapted to adjust said first dosage ($d_1$) of reduction agent (204) such that a ratio between an actual reductant buffer in a selective catalytic reduction catalyst (206) located downstream said portion (212) of said exhaust aftertreatment system (200) and a maximum reductant buffer in said selective catalytic reduction catalyst (206) at a current operating temperature in said selective catalytic reduction catalyst (206) is within the range of 0.2 to 0.6, preferably 0.3 to 0.5, more preferably 0.4 to 0.5.

19. The control unit (214) according to any of the points 15 to 18, wherein said future operating sequence (300) is determined to be suitable for reducing said deposits if a ratio between an estimated workload of said internal combustion engine (102) in said first temporal portion ($t_1$) and the estimated workload in the second temporal portion ($t_2$) is at least 1.5, preferably at least 2.

20. The control unit (214) according to point 19, wherein a ratio between said estimated workload in the second temporal portion ($t_2$) and said maximum workload of said internal combustion engine (102) is less than 0.5.

21. The control unit (214) according to any of points 15 to 20, wherein said control unit (214) further is adapted to identify a deposits parameter indicative of a level of deposits in said portion (212) of said exhaust aftertreatment system (200) and wherein said confirmation procedure further comprises:

confirming that said level of deposits is equal to or exceeds a predeterminable threshold.

22. The control unit (214) according to any of points 15 to 21, wherein said control unit (214) further is adapted to identify a temperature parameter indicative of a temperature of said portion (212) of said exhaust aftertreatment system (200) and wherein said control unit (214) is adapted to perform said deposit removal dosage procedure in dependence on said temperature parameter, preferably said control unit (214) is adapted to initiate said second dosage ($d_2$) in dependence on said temperature parameter.

23. The control unit (214) according to point 22, wherein said control unit (214) is adapted to initiate said second dosage ($d_2$) in response to detecting that said temperature parameter has a temperature increase rate at or below a predetermined increase rate threshold.

24. The control unit (214) according to point 22 or 23, wherein said temperature of said portion (212) of said exhaust aftertreatment system (200) is a temperature of a wall portion of said portion (212) of said exhaust aftertreatment system (200).

25. The control unit (214) according to any of points 15 to 24, wherein said future operating sequence (300) further comprises a third temporal portion ($t_3$), said third temporal portion ($t_3$) being subsequent said second temporal portion ($t_2$), and wherein said deposit removal dosage procedure further comprises controlling said injector (202) such that a third dosage ($d_3$) of reduction agent (204) is injected into said exhaust aftertreatment system (200) during at least a part of said third temporal portion ($t_3$), said control unit (214) being adapted to adjust said third dosage ($d_3$) such a ratio between an actual reductant buffer and a maximum reductant buffer at a current operating condition in a selective catalytic reduction catalyst (206) located downstream said portion (212) of said exhaust aftertreatment system (200) is within the range of 0.2 to 0.6, preferably 0.3 to 0.5, more preferably 0.4 to 0.5.

26. The control unit (214) according to any of the preceding points, wherein said internal combustion engine (102) propels a vehicle (100) and wherein said feature of confirming that said future operating sequence (300) is suitable for reducing said deposits comprises confirming that said vehicle (100) is predicted to be driven in at least one of the following driving conditions:

uphill driving during at least a majority of said first temporal portion ($t_1$) and level or downhill driving during at least a majority of said second temporal portion ($t_2$), acceleration during at least a majority of said first temporal portion ($t_1$) and driving at constant speed or deceleration during at least a majority of said second temporal portion ($t_2$), entering a motorway during said first temporal portion ($t_1$) and driving on said motorway during said second temporal portion ($t_2$), overtaking another vehicle during said first temporal portion ($t_1$) and driving at constant speed or deceleration during said second temporal portion ($t_2$).

27. The control unit (214) according to point 26, wherein said vehicle (100) comprises a route planning system (104), preferably comprising a GPS and/or a map database, and wherein said feature of confirming that said vehicle (100) is predicted to be driven in at least one of said driving conditions comprises using said route planning system (104), preferably said control unit (214) is adapted to receive information from said route planning system (104).

28. The control unit (214) according to any of points 15-27, wherein said reduction agent (204) is a reduction agent for NOx emissions, preferably an aqueous urea solution.

29. An exhaust aftertreatment system (200) for an internal combustion engine (102), said exhaust aftertreatment system (200) comprising a source (210) of reduction agent (204), said source (210) being in fluid connection with an injector (202), said injector (202) being adapted to inject said reduction agent (204) into a portion (212)

of said exhaust aftertreatment system (200), said portion (212) of said exhaust aftertreatment system (200) being located downstream of said injector (202), as seen in an intended direction of flow (208) of exhaust gas in said exhaust aftertreatment system (200), said exhaust aftertreatment system (200) comprising a control unit (214) according to any one of points 15-28, said control unit (214) being adapted to issue a signal to said injector (202) in order to control a dosage of reduction agent (204) from said injector (202).

30. A vehicle (100) comprising a control unit (214) according to any one of points 15-28 and/or an exhaust aftertreatment system (200) according to point 29.

It is to be understood that the present invention is not limited to the embodiments described above and illustrated in the drawings; rather, the skilled person will recognize that many changes and modifications may be made within the scope of the appended claims.

The invention claimed is:

1. A method for reducing deposits related to a reduction agent in a portion of an exhaust aftertreatment system of an internal combustion engine, said exhaust aftertreatment system comprising an injector for injecting the reduction agent into said exhaust aftertreatment system, and said portion of said exhaust aftertreatment system being located downstream of said injector, as seen in an intended direction of flow of exhaust gas in said exhaust aftertreatment system, said method comprising the steps of:
    identifying a future operating sequence for said internal combustion engine, said future operating sequence comprising a first temporal portion ($t_1$) and a second temporal portion ($t_2$), said second temporal portion ($t_2$) being subsequent to said first temporal portion ($t_1$),
    performing a confirmation procedure comprising:
        confirming that said future operating sequence is suitable for reducing said deposits and
        confirming that said internal combustion engine operates in accordance with said precedingly identified future operating sequence,
    in response to said confirmation procedure being affirmative, executing a deposit removal dosage procedure comprising controlling said injector such that a first dosage ($d_1$) of reduction agent is injected into said exhaust aftertreatment system during at least a part of said first temporal portion ($t_1$) and that a second dosage ($d_2$) of reduction agent is injected into said exhaust aftertreatment system during at least a part of said second temporal portion ($t_2$) said second dosage ($d_2$) being smaller than said first dosage ($d_1$).

2. The method according to claim 1, wherein a ratio between said second dosage ($d_2$) and a maximum dosage that can be injected by the injector is less than 0.05, and/or wherein a ratio between said second dosage ($d_2$) and said first dosage ($d_1$) is less than 0.05.

3. The method-according to claim 1, wherein said first dosage ($d_1$) of said reduction agent is such that a ratio between an actual reductant buffer and a maximum reductant buffer at a current operating condition in a selective catalytic reduction catalyst located downstream said portion of said exhaust aftertreatment system is within the range of 0.2 to 0.6.

4. The method-according to claim 1, wherein said future operating sequence is determined to be suitable for reducing said deposits if a ratio between an estimated workload of said internal combustion engine in said first temporal portion ($t_1$) and the estimated workload in the second temporal portion ($t_2$) is at least 1.5, and wherein preferably a ratio between said estimated workload in the second temporal portion ($t_2$) and said maximum workload of said internal combustion engine is less than 0.5.

5. The method according to claim 1, wherein said method further comprises a step of identifying a deposits parameter indicative of a level of deposits in said portion of said exhaust aftertreatment system and wherein said confirmation procedure further comprises:
    confirming that said level of deposits is equal to or exceeds a predeterminable threshold.

6. The method according to claim 1, wherein said method further comprises identifying a temperature parameter indicative of a temperature of said portion of said exhaust aftertreatment system and wherein said deposit removal dosage procedure is performed in dependence on said temperature parameter, preferably the initiation of said second dosage ($d_2$) is dependent on said temperature parameter.

7. The method according to claim 6, wherein said second dosage ($d_2$) is initiated in response to detecting that said temperature parameter has a temperature increase rate at or below a predetermined increase rate threshold.

8. The method according to claim 6, wherein said temperature of said portion of said exhaust aftertreatment system is a temperature of a wall portion of said portion of said exhaust aftertreatment system.

9. The method according to claim 1, wherein said future operating sequence further comprises a third temporal portion ($t_3$), said third temporal portion ($t_3$) being subsequent said second temporal portion ($t_2$), and wherein said deposit removal dosage procedure further comprises controlling said injector such that a third dosage ($d_3$) of reduction agent is injected into said exhaust aftertreatment system during at least a part of said third temporal portion ($t_3$), said third dosage ($d_3$) being such that a ratio between an actual reductant buffer and a maximum reductant buffer at a current operating condition in a selective catalytic reduction catalyst located downstream said portion of said exhaust aftertreatment system is within the range of 0.2 to 0.6.

10. The method according to claim 1, wherein said internal combustion engine propels a vehicle and wherein said feature of confirming that said future operating sequence is suitable for reducing said deposits comprises confirming that said vehicle is predicted to be driven in at least one of the following driving conditions:
    uphill driving during at least a majority of said first temporal portion ($t_1$) and level or downhill driving during at least a majority of said second temporal portion ($t_2$),
    acceleration during at least a majority of said first temporal portion ($t_1$) and driving at constant speed or deceleration during at least a majority of said second temporal portion ($t_2$),
    entering a motorway during said first temporal portion ($t_1$) and driving on said motorway during said second temporal portion ($t_2$),
    overtaking another vehicle during said first temporal portion ($t_1$) and driving at constant speed or deceleration during said second temporal portion ($t_2$).

11. The method according to claim 10, wherein said vehicle comprises a route planning system comprising a GPS and/or a map database, and wherein said feature of confirming that said vehicle is predicted to be driven in at least one of said driving conditions comprises using said route planning system.

12. The method according to claim 1, wherein said reduction agent is a reduction agent for NOx emissions, preferably an aqueous urea solution.

13. A control unit adapted for reducing deposits related to a reduction agent in a portion of an exhaust aftertreatment system of an internal combustion engine, said exhaust aftertreatment system comprising an injector for injecting said reduction agent into said exhaust aftertreatment system, and said portion of said exhaust aftertreatment system being located downstream of said injector, as seen in an intended direction of flow of exhaust gas in said exhaust aftertreatment system, said control unit being adapted to:
  identify a future operating sequence for said internal combustion engine, said future operating sequence comprising a first temporal portion ($t_1$) and a second temporal portion ($t_2$), said second temporal portion ($t_2$) being subsequent to said first temporal portion ($t_1$),
  perform a confirmation procedure comprising:
    confirming that said future operating sequence is suitable for reducing said deposits and
    confirming that said internal combustion engine operates in accordance with said precedingly identified future operating sequence,
  in response to said confirmation procedure being affirmative, execute a deposit removal dosage procedure comprising controlling said injector such that a first dosage ($d_1$) of reduction agent is injected into said exhaust aftertreatment system during at least a part of said first temporal portion ($t_1$) and that a second dosage ($d_2$) of reduction agent is injected into said exhaust aftertreatment system during at least a part of said second temporal portion ($t_2$), said second dosage ($d_2$) being smaller than said first dosage ($d_1$).

14. An exhaust aftertreatment system for an internal combustion engine, said exhaust aftertreatment system comprising a source of reduction agent, said source being in fluid connection with an injector, said injector being adapted to inject said reduction agent into a portion of said exhaust aftertreatment system, said portion of said exhaust aftertreatment system being located downstream of said injector, as seen in an intended direction of flow of exhaust gas in said exhaust aftertreatment system, said exhaust aftertreatment system comprising a control unit according to claim 13, said control unit being adapted to issue a signal to said injector in order to control a dosage of reduction agent from said injector.

15. The control unit according to claim 13 where the control unit is part of a vehicle.

16. The exhaust aftertreatment system according to claim 14 wherein the exhaust aftertreatment system is part of a vehicle.

* * * * *